United States Patent [19]

Stansfield et al.

[11] Patent Number: 4,668,980

[45] Date of Patent: May 26, 1987

[54] VIDEO RETOUCHING SYSTEMS

[75] Inventors: Peter W. Stansfield, Hatfield; Alastair Reed, Bedfordshire, both of England

[73] Assignee: Crosfield Electronics (USA) Limited, London, England

[21] Appl. No.: 811,218

[22] Filed: Dec. 20, 1985

[30] Foreign Application Priority Data

Jan. 9, 1985 [GB] United Kingdom ............... 8500493

[51] Int. Cl.$^4$ .............................................. G03F 3/08
[52] U.S. Cl. ......................................... 358/80; 358/76
[58] Field of Search ................... 358/80, 76, 78, 75

[56] References Cited

U.S. PATENT DOCUMENTS

| | | | |
|---|---|---|---|
| 4,464,677 | 8/1984 | Kuhn et al. | 358/75 |
| 4,488,245 | 12/1984 | Dalke et al. | 358/80 X |
| 4,496,968 | 1/1985 | Pugsley | 358/75 X |
| 4,598,282 | 7/1986 | Pugsley | 358/76 X |
| 4,613,897 | 9/1986 | Stansfield | 358/80 |
| 4,617,592 | 10/1986 | MacDonald | 358/80 |

FOREIGN PATENT DOCUMENTS 2853510 6/1980 Fed. Rep. of Germany.

Primary Examiner—Michael A. Masinick
Assistant Examiner—E. Anne Toth
Attorney, Agent, or Firm—Sughrue, Mion, Zinn, Macpeak and Seas

[57] ABSTRACT

A method and apparatus for retouching an image represented by color printing data in the form of a number of sets of input data, one set for each of the printing colors, is described. The apparatus comprises a source (1) of color component image data; a reference data set generator (2;9,10) for generating a reference data set comprising the color components of a limited plurality of reference colors; and a color converter (2;9,10) for generating a temporary data set from the color printing data and the reference data set, the temporary set representing the original image in terms of the reference colors. A refresh store (3) receives the temporary data set and feeds the temporary data set to a monitor (8) via a conversion system. The conversion system includes one or more look-up tables (5) defining printing ink modifying functions and an operator table (6) for controlling the contents of the or each look-up table (5). The arrangement is such that the temporary data set is applied to the monitor (8) via the look-up tables (5) whereby the color components defined by the temporary data set are modified in accordance with the contents of the look-up tables before passing to the monitor (8). Due to the limited plurality of reference colors with which the original image is defined, it is possible for the operator to retouch the image displayed on the monitor (8) in real time and interactively.

6 Claims, 2 Drawing Figures

VIDEO RETOUCHING SYSTEMS

FIELD OF THE INVENTION

The invention relates to methods and apparatus for retouching colour printing data representing an original image.

DESCRIPTION OF THE PRIOR ART

In modern electronic image scanning and reproduction systems, an original image is scanned to generate colour printing data which, for each pixel of the original image, represents the density of a particular colour component. Typically, four printing ink colour components are used: cyan, magenta, yellow and black (CMYK). In general, it is necessary to modify or retouch the colour component values derived from the scanner before an image is reproduced. This involves setting up for each printing ink colour component a modifying function which modifies the original scanned values into values suitable for reproduction. The form of these modifying functions is determined by an operator who views the image on a monitor and thereafter changes the form of the printing ink modifying functions as necessary to obtain a desired resultant image.

One of the problems with electronic image retouching is that the printing ink colour components are not the same as the monitor colour components. Typically, the monitor colour components will be red, green, and blue. There is a problem in converting the printing ink colour changes to the monitor format colour changes and vice versa at a fast enough speed to enable an image to be interactively retouched. One attempt at solving this problem is proposed in European Patent Specification No. 0090596. In this system, a set of RGB tables are calculated that correspond to a set of CYMK tables for neutral colours only, on the assumption that neutral colours are the most important. This system is difficult to implement, and because of the assumptions made, breaks down particularly for large changes to saturated colours.

SUMMARY OF THE INVENTION

In accordance with one aspect of the present invention, a method of retouching an image represented by colour printing data in the form of a number of sets of input data, one set for each of the printing colours, comprises:

(1) generating a reference data set comprising the colour components of a limited plurality of reference colours;
(2) generating a temporary data set from the colour printing data and the reference data set, the temporary data set representing the original image in terms of the reference colours;
(3) applying the temporary data set after modification by respective printing ink modifying functions to a monitor to view the image, and if necessary, after converting the colour components to printing ink colour components, and, reconversion to monitor format signals;
(4) under the control of an operator, updating one or more of the printing colour modifying functions; and,
(5) repeating steps 2 to 4 until the operator is satisfied with the viewed image.

Subsequently the printing colour modifying functions are used to modify the sets of input data for the production of colour separations under the control of this data.

With this invention, instead of attempting to convert all the combinations of printing ink colour components defining the pixels of the original image to monitor format signals, the original image is defined in terms of a limited plurality of reference colours. This considerably simplifies the retouching method since this limited plurality of reference colours can be rapidly converted in real time from printing ink colour components to corresponding monitor format colour components.

Although, in some limited circumstances, a predetermined reference data set could be used, it is preferable to determine a reference data set for each original image.

Preferably, the step 1 comprises analysing the input data to determine the most commonly occurring colours in the original image, and determining the colour components of the most commonly occurring colours to generate the reference data set.

In some cases, where commonly occurring colours are very closely positioned in colour space, it may be preferable to define a reference colour between the two commonly occuring colours instead of defining two reference colours corresponding to those two commonly occurring colours. This may be convenient even where the defined reference colour is not itself a commonly occurring colour.

The printing ink modifying functions typically comprise one or more algorithms which are defined during the retouching stage of the method. In some examples, separate algorithms may be derived for each of the colour components or alternatively or additionally algorithms may be defined which apply to two or more of the colour components. This latter possibility will occur where for example an increase or decrease in "redness" is desired.

Once the printing colour modifying functions have been defined in the retouching stage, they are then applied to the original colour printing data as previously mentioned.

The major advantage of the invention is that it enables interactive retouching to be accurately carried out in real time since although the printing ink modifying functions are applied to all the pixels these are defined in terms of a limited plurality of reference colours and not by a full range of colours. For example, in typical systems where the colour printing data is defined in terms of three printing inks, cyan, magenta, and yellow, each component may be defined in terms of one of 256 different quantities. This leads to an overall possibility of $256^3$ combinations of colours which could be present in the original image. It will clearly take a long time, typically in the order of two hours, to apply the printing ink modifying functions to pixels which may have this range of colours. In contrast to this, in the invention the original image is defined in terms of just a limited plurality of reference colours, for example 256 colours. Thus, there is a maximum of 256 different sets of calculations which must be performed when applying printing ink modifying functions to these colours.

The reference data set may be defined in terms of printing ink colour components or monitor format colour components.

In accordance with a second aspect of the present invention, apparatus for retouching an image represented by colour printing data in the form of a number of sets of input data, one set for each of the printing colours, comprises a source of colour component image data; means for generating a reference data set comprising colour components of a limited plurality of reference colours; colour converting means for generating a temporary data set from the colour printing data and the reference data set, the temporary data set representing the original image in terms of the reference colours; a monitor; a refresh store for receiving the temporary data set; and conversion means for modifying the colour components of the temporary data set and for passing the temporary data set in the form of monitor format colour components from the refresh store to the monitor, the conversion means including one or more look-up tables (LUT) defining printing ink modifying functions and an operator control means for controlling the contents of the or each LUT, the arrangement being such that the temporary data set is applied to the monitor via the LUTs whereby the colour components defined by the temporary data set are modified in accordance with the contents of the LUTs before passing to the monitor.

In one example, where the reference colours are defined in terms of printing ink colour components, the conversion means comprises first subsidiary conversion means to convert the temporary data set to printing ink colour components which are applied to the LUTs, and second subsidiary conversion means for converting modified printing ink colour components from the LUTs to monitor format signals which are applied to the monitor.

In another example, where the reference colours are defined in terms of monitor format colour components, the conversion means comprises third subsidiary conversion means to convert the temporary data set to printing ink colour components which are applied to the LUTs, and fourth subsidiary conversion means to convert the modified printing ink colour components from the LUTs to monitor format signals which are applied to the monitor.

BRIEF DESCRIPTION OF THE DRAWINGS

Two examples of methods and apparatus in accordance with the invention will now be described with reference to the accompanying block diagrams, in which.

DETAILED DESCRIPTION OF THE INVENTION

Figure 1:
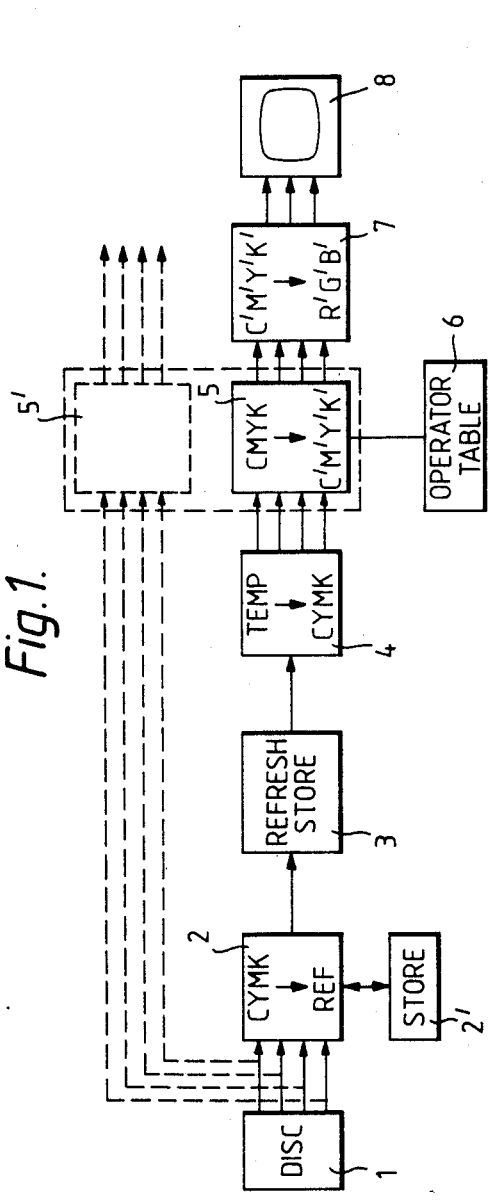
FIG. 1 illustrates a first example in which the temporary data set is represented by printing ink colour components.

The apparatus illustrated in FIG. 1 comprises a disc store 1 which contains for each pixel of an original image digital data representing the colour density of four printing colour components: cyan (C), magenta (M), yellow (Y), and black (K). In other examples the black component may be omitted. This data may have been generated electronically or may have been derived from scanning an original image using a scanner such as one of our Crosfield Magnascan 600 series. The data constitutes values from 0 to 255 for each component in a conventional manner. The colour component data from the disc store 1 is fed to a microprocessor 2.

The microprocessor 2 analyses the resultant colours of each pixel and determines the 256 most commonly occurring colours in the image using a histogram based method. These colours are then defined in terms of their printing ink colour components and stored in a store 2' of the microprocessor 2. An example of the data stored in part of the store is illustrated in Table 1 below.

TABLE 1

| Ref. Colour No. | C | M | Y | K |
|---|---|---|---|---|
| 000 | 50 | 100 | 81 | 4 |
| 001 | 200 | 24 | 150 | 5 |
| . | | | | |

After the reference colours have been set up, the microprocessor 2 then allots one of the 256 reference colours to each pixel of the original image by selecting the reference colour closest to the pixel colour. The result of this is that each pixel of the image is defined in terms of one of the 256 different reference colours rather than a possible maximum of $256^4$ colours.

The microprocessor 2 then outputs to a refresh store 3 data representing the reference colour number for each pixel. This data is applied to a look-up table (LUT) 4 containing the information shown in Table 1 above. The look-up table 4 converts the reference colour number for each pixel into the values of each printing ink colour component, these values then being fed to one or more look-up tables 5.

The look-up tables 5 define printing ink modifying functions which modify the incoming printing ink colour component values in accordance with a predetermined algorithm. Such algorithms are well known and may modify individual printing ink colour components or combinations of colour components. The or each LUT may have 1, 2, or 3 dimensions. The form of the functions defined by the look-up tables 5 can be controlled by an operator via an operator table 6. Initially, the algorithms will define substantially a 1:1 correspondence between input and output colours.

The modified printing ink colour components for each pixel are passed from the look-up tables 5 to a colour converter 7 which converts the printing ink colour components to monitor format colour components red (R'), green (G'), and blue (B'). The output from the converter 7 is fed to a monitor 8 which then displays the modified image.

An operator views the displayed image and if he desires to modify this further, he adjusts one or more of the algorithms defined by the look-up tables 5 and then the refresh store 3 causes the temporary data set to be reapplied through thhe converter 4, LUTs 5, and converter 7 to the monitor 8. This application is fast and takes place in real time (typically in the order of 40 milliseconds).

Once the operator considers that the image displayed on the monitor 8 is satisfactory, the printing ink colour components are applied directly from the disc store 1 to the LUTs 5. The LUTs 5 apply to the original pixel data the algorithms defined by the operator. The outputs from the LUTs 5 are then fed to conventional exposing apparatus (not shown). This is illustrated diagrammatically in FIG. 1 by means of additional LUTs 5' (identical to LUTs 5 and holding identical information) to which pixel data is fed in parallel with the retouching system. In practice the same LUTs 5 will be used in each stage. This stage, which can typically take 2 hours, will take place as background processing.

Figure 2:
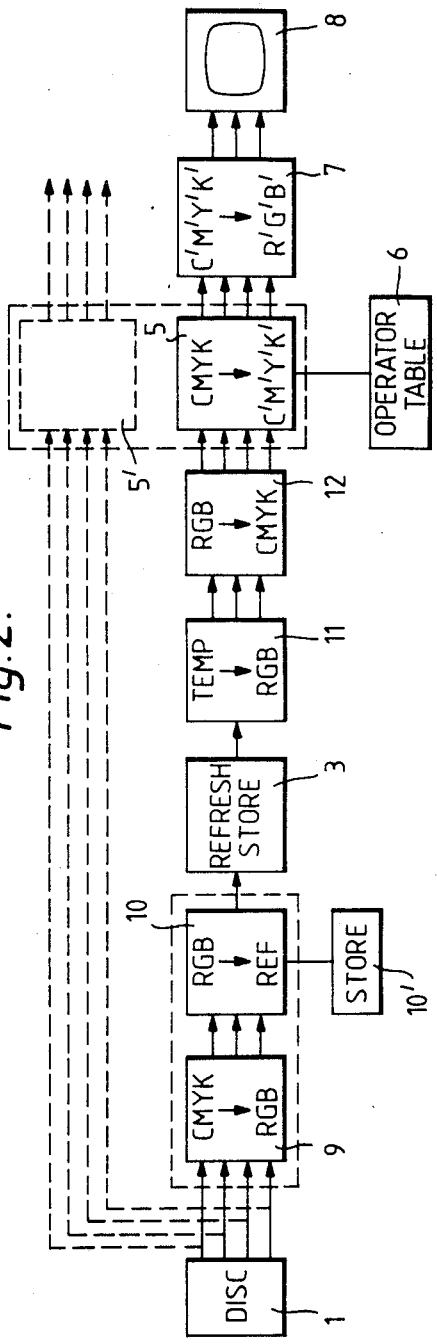
FIG. 2 illustrates a second example in which the temporary data is represented by monitor format colour components.

The FIG. 2 example is similar to the FIG. 1 example except that the temporary data set is defined in terms of monitor format colour components (RGB) rather than printing ink colour components (CYMK). The same reference numerals are used in FIG. 2 as in FIG. 1 to indicate similar components. In this example, the output of the disc store 1 is fed to a colour converter 9 which converts the printing ink colour components for each pixel into corresponding monitor format colour components. This is a reasonably straight forward operation since there is a unique set of monitor format colour components for each set of printing ink colour components. The monitor format colour components are then fed to a microprocessor 10 similar to the microprocessor 2 which, after analysing the incoming data, generates a reference data set which is stored in a store 10' and an example of part of which is shown in Table 2 below.

TABLE 2

| Ref. Colour No | R | G | B |
| --- | --- | --- | --- |
| 000 | 147 | 12 | 6 |
| 001 | 187 | 29 | 141 |
| 002 | 101 | 177 | 241 |

The microprocessor 10 then allots a reference colour number to each pixel depending upon the make-up of that pixel in terms of monitor format colour components as determined by converter 9. This temporary data set is then fed to the refresh store 3 whose output is fed to a colour converter 11 which converts the temporary data set in the form of reference colour numbers to the monitor format colour components (RBG).

The colour components are fed to a colour converter 12 which converts the colour components to printing ink colour components (CYMK). It should be noted that since only a limited number, typically 256, of reference colours are defined the colour converter 12, which will be a look-up table, can be simply set up to define uniquely a set of 256 CYMK values corresponding to the 256 RGB values.

The rest of the apparatus shown in FIG. 2 is the same as shown in FIG. 1. After retouching, the original data stored in disc 1 is fed directly to the LUTs 5 (5's in FIG. 2) and their output is fed either to a store or to image generating apparatus in a conventional manner.

It should be appreciated that although the various elements have been shown as separate blocks of hardware, this is for ease of description. In practice the functions of the blocks (except the disc 1, the operator table 6 and the monitor 8) will be performed by a suitably programmed microcomputer.

In addition, in the examples the printing ink colour components are different from the monitor format signals but if they were the same the converter 7 could be omitted.

We claim:

1. A method of retouching an image represented by colour printing data in the form of a number of sets of input data, one set for each of the printing colours, the method comprising
   (1) generating a reference data set comprising said colour components of a limited plurality of reference colours;
   (2) generating a temporary data set from said colour printing data and said reference data set, said temporary data set representing said original image in terms of said reference colours;
   (3) applying said temporary data set after modification by respective printing ink modifying functions to a monitor to view said image, and if necessary, after converting said colour components to printing ink colour components, and, reconversion to monitor format signals;
   (4) under the control of an operator, updating one or more of said printing colour modifying functions; and,
   (5) repeating steps 2 to 4 until the operator is satisfied with said viewed image.

2. A method according to claim 1, wherein said step 1 comprises analysing said input data to determine the most commonly occurring colours in said original image, and determining the colour components of the most commonly ocurring colours to generate said reference data set.

3. Apparatus for retouching an image represented by colour printing data in the form of a number of sets of input data, one set for each of the printing colours, the apparatus comprising a source of colour component image data; means for generating a reference data set comprising colour components of a limited plurality of reference colours; colour converting means for generating a temporary data set from said colour printing data and said reference data set, said temporary data set representing said original image in terms of said reference colours; a monitor; a refresh store for receiving said temporary data set; and conversion means for modifying the colour components of said temporary data set and for passing said temporary data set in the form of monitor format colour components from said refresh store to said monitor, said conversion means including at least one look-up table (LUT) defining printing ink modifying functions and an operator control means for controlling the contents of said at least one LUT, whereby said temporary data set is applied to said monitor via said at least one LUT so that the colour components defined by said temporary data set are modified in accordance with the contents of said at least one LUT before passing to said monitor.

4. Apparatus according to claim 3, in which said reference colours are defined in terms of printing ink colour components, said conversion means comprising first subsidiary conversion means to convert said temporary data set to printing ink colour components which are applied to said at least one LUT, and second subsidiary conversion means for converting modified printing ink colour components from said at least one LUT to monitor format signals which are applied to the monitor.

5. Apparatus according to claim 3, in which said reference colours are defined in terms of monitor format colour components, said conversion means comprising third subsidiary conversion means to convert said temporary data set to printing ink colour components which are applied to said at least one LUT, and fourth subsidiary conversion means to convert said modified printing ink colour components from said at least one LUT to monitor format signals which are applied to said monitor.

6. Apparatus for retouching an image represented by colour printing data in the form of a number of sets of input data, one set for each of the printing colours, the apparatus comprising a source of colour component image data; a monitor; and a computer programmed to generate a reference data set comprising said colour components of a limited plurality of reference colours, to generate a temporary data set from said colour printing data and said reference data set, said temporary data set representing said original image in terms of said reference colours, to modify the temporary data set with respective printing modifying functions, and to apply the modified temporary data set to the monitor to enable the image to be viewed, and if necessary, after converting said colour components to printing ink colour components, and, reconversion to monitor format signals; said computer being responsive to operator control to enable at least one of said printing colour modifying functions to be updated.

* * * * *